S. BARLEY.
Thrashing Machine.
No. 5,137.
3 Sheets—Sheet 1.
Patented June 5, 1847.
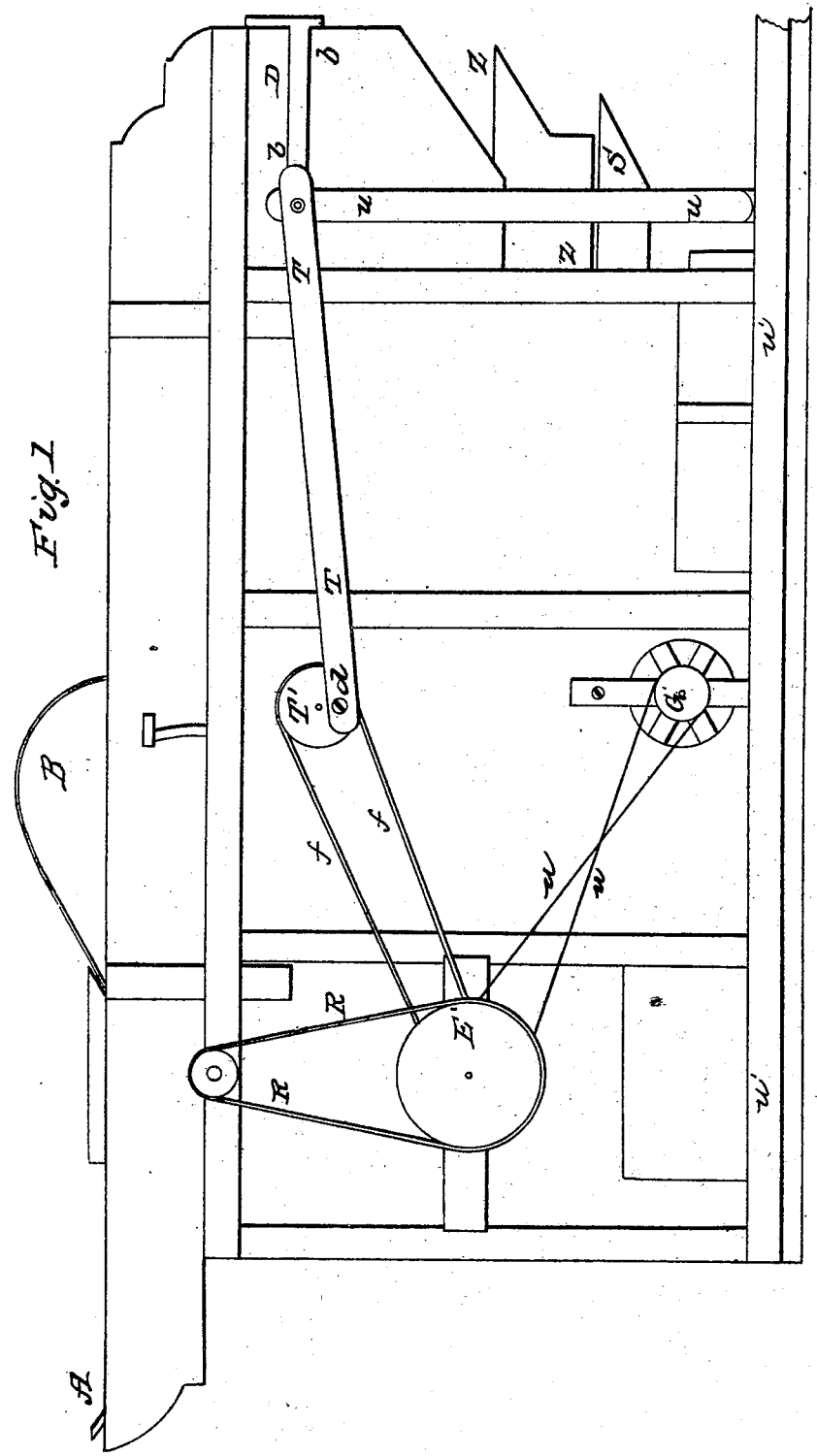

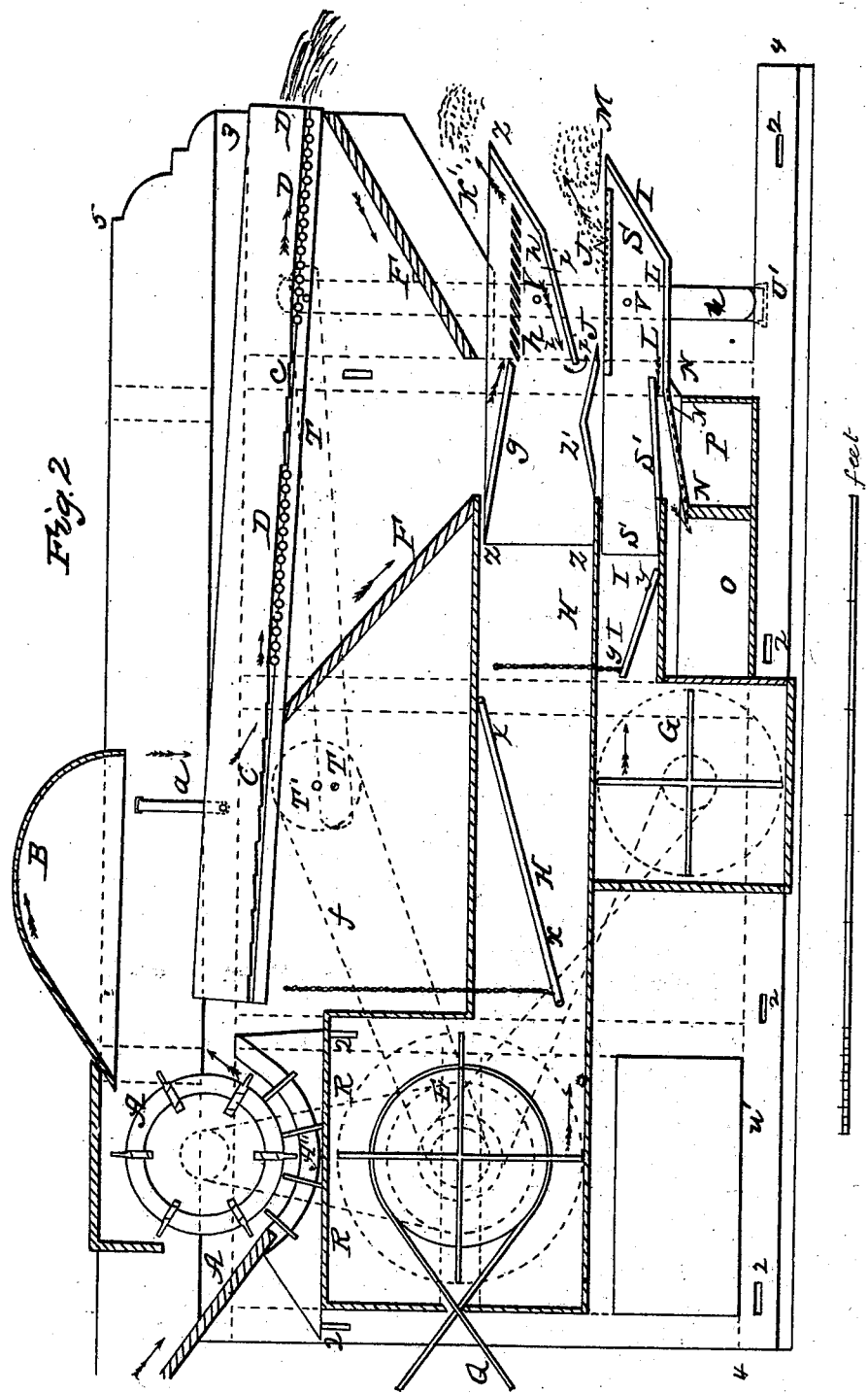

S. BARLEY.
Thrashing Machine.
No. 5,137.
3 Sheets—Sheet 3
Patented June 5, 1847.
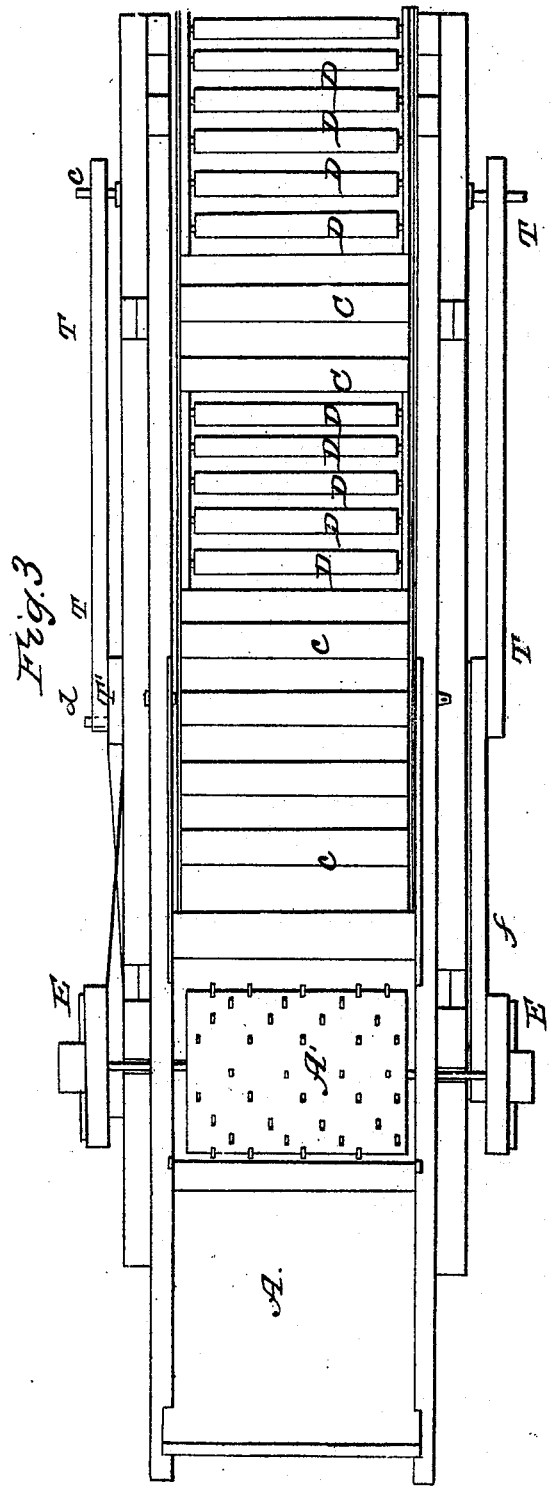

UNITED STATES PATENT OFFICE.

SAMUEL BARLEY, OF KERRS CREEK, VIRGINIA.

THRESHING-MACHINE.

Specification of Letters Patent No. 5,137, dated June 5, 1847.

*To all whom it may concern:*

Be it known that I, SAMUEL BARLEY, of Kerrs Creek, in the county of Rockbridge and State of Virginia, have made certain new and useful Improvements in the Manner of Constructing Machines for Threshing and Cleaning Wheat and other Grain; and I do hereby declare that the following is a full and exact description thereof.

My threshing and cleansing machine does not differ materially in its general construction and operation from some other machines for a like purpose, but I have made improvements in certain parts thereof by which it is rendered more efficient in its operation than those heretofore used.

In the accompanying drawing Figure 1, is a side elevation of the machine; Fig. 2, a vertical section of it through its middle, from front to back, and Fig. 3, is a top view of it, the cap, or cover, B, which is immediately in the rear of the threshing cylinder being removed for the purpose of showing the whole of the upper part of the shaker, or separator, on which the straw is to be carried out clear of the machine, while the grain falls through to be operated on by the cleansing apparatus. These drawings are made on a scale of an inch and a half to the foot; but, of course, the machine may be larger, or smaller, but that represented is of the ordinary size. In each of these figures where the same parts are represented they are designated by the same letters of reference.

A, is the inclined feeding board down which the grain to be threshed and cleaned is to be passed.

A', is the threshing cylinder, and A'', the concave adapted to said cylinder. The spikes, or beaters, by which the threshing is to be effected may be formed and arranged in any of the known modes of affixing and using them. B, is a cap, or cover, against which the straw and grain are thrown as they escape from the threshing apparatus. C, C, D, D, is the shaker, or separator, which receives the straw and grain as they leave the threshing cylinder. This shaker is peculiar in its construction, its bottom or floor, consisting, alternately of a covering of boards C, C, which are grooved into steps, from side to side of the shaker, and of rollers D, D, that turn on pivots at their ends. These rollers I make about three fourths of an inch in diameter, and place them about half an inch apart. D', D', is one of the sides of the shaker, which is suspended, and made to vibrate in the following manner; a, is a strap the upper end of which is attached by a joint pin to the side of the machine, and the other to the side of the shaker, there being such straps on each side of the machine. Near the rear end of the shaker there are pins that are firmly attached to it, and that pass through slots in the sides of the machine, one of which is shown at b, b, Fig. 1, and the end of the pin at c; these pins pass through vibrating bars U, U, that are sustained on the side sill U', of the frame, and they pass also through a shackle bar T, T, that is connected by a crank pin d, to the whirl T' that is made to revolve by a suitable band. The shaker should have a descent, in its length, of about six inches and may vibrate to the distance of four or five inches. The advantage derived from the particular manner of constructing the shaker, is that the vertical portion of the flutes C, aid in carrying the straw forward on to the rollers, and when it arrives on these its forward motion causes them to turn, and the shorter pieces of straw are thereby raised, and prevented from passing through the openings, or becoming entangled in the spaces, as is apt to occur when rollers are not used.

There are two fan wheels for completing the cleansing of the grain, one of which I will call the large, and the other, the small fan wheel. In the section Fig. 2, the large fan wheel is shown at E, as driven by a band Q, from the first mover. E', Fig. 1, is a whirl or the axis of said wheel, from which a strap R, R, is made to drive the threshing cylinder shaft e. From the shaft of the fan E the small fan G, (Fig. 2) may also be driven by a strap w, w, passing around a whirl G' (Fig. 1) on its shaft. The whirl T', carrying the shaker, may also be driven by the same shaft by a strap f, f. By the descent and vibration of the shaker, aided by the form given to the grooves C, C, the grain and straw will be made to pass toward its rear end, and the grain and chaff will fall between the rollers D, D, on to the inclined boards F, F, (Fig. 2,) that extend from side to side of the machine, and conduct them down to the cleaning apparatus, by which the grain will be separated from the foreign matter. Z, Z, Z, is a large vibrating shoe, or shaking box, that is operated on by the wind from the large fan, passing through the tube, or channel, H, H, Fig. 2. The top of the shoe Z, consists of an inclined board $g$, and of slats $h, h$, placed obliquely, like those of a blind shutter, at an angle, say of about 45° degrees; the wind from the large fan wheel passing up through the spaces between these slots, will drive out the chaff and other matter lighter than the grain, through an opening at K. The bottom of the vibrating box Z, is elevated as shown at Z', so as to give an upward direction to the wind, and to allow a free descent of the grain down the inclined bottom $i, i$, into a second shoe, or vibrating box. The grain, and other heavy matter falling on the inclined bottom $i, i$, will slide down it, and enter a second vibrating shoe S, S, by passing through an opening $i'$, on to a screen J, J, that forms a portion of the upper part of said shoe, and the meshes of which are of such size as to allow the grain to pass through, and to exclude larger substances. The wind from the small fan G passes from it through the tube, or channel I, I, into the vibrating shoe S, S, and is directed upward by the inclined board S' and passes with such force through the screen J, as to drive off all matter lighter than the grain which passes through it and on to the bottom L, L, of the shoe, where it passes on to a screen N, N, which allows the cockle, and small seeds to enter the screening box P, and delivers the cleaned grain into the box O. In the tubes, or channels H, H, and I, I, there are shutters $x, x$, and $y, y$, that may be raised or lowered at pleasure, and these serve to regulate the entrance of the wind into the tubes, and shoes.

The manner of vibrating the shoes, or boxes Z, Z, and S, S, is as follows. From each of the sides of these boxes pins V, V, (Fig. 2) enter the vibrating bars U, and thereby serve to give the required vibration to them as well as to the shaker, the distance they traverse being proportioned to the distance of the pins V, V, from the bottom of the vibrating bars.

Having thus fully described the manner in which I construct and arrange the respective parts of my machine for threshing and cleaning of grain, what I claim therein as new, and desire to secure by Letters Patent is,

1. The manner in which I construct the shaker, by forming its bottom of fluted boards, and of rollers turning upon pivots, substantially in the manner, and for the purpose set forth; and 2. I claim the particular manner in which I have arranged and combined the two fan wheels, and the two vibrating boxes, or shoes, operated by means of the vibrating bars, and otherwise constructed and actuated in the manner described.

SAMUEL BARLEY.

Witnesses:
 THOS. P. JONES,
 LEM. WILLIAMS.